United States Patent
Saint-Jalmes et al.

(10) Patent No.: US 7,942,367 B2
(45) Date of Patent: May 17, 2011

(54) REST COMPARTMENT FOR AN AIRCRAFT PILOT

(75) Inventors: Bruno Saint-Jalmes, Toulouse (FR); Jason Zaneboni, Blagnac (FR); Bernard Rumeau, Cornebarrieu (FR)

(73) Assignee: Airbus, Blagnac (FR)

( * ) Notice: Subject to any disclaimer, the term of this patent is extended or adjusted under 35 U.S.C. 154(b) by 117 days.

(21) Appl. No.: 11/964,448

(22) Filed: Dec. 26, 2007

(65) Prior Publication Data
US 2008/0149766 A1 Jun. 26, 2008

(30) Foreign Application Priority Data
Dec. 26, 2006 (FR) ...................................... 06 11357

(51) Int. Cl.
*B64D 11/00* (2006.01)
(52) U.S. Cl. ...................................... 244/118.5; 182/95
(58) Field of Classification Search ............... 244/118.5, 244/118.6, 117 R; 182/86, 152, 156, 91, 182/95, 106, 159, 161
See application file for complete search history.

(56) References Cited

U.S. PATENT DOCUMENTS

| 1,220,337 | A | * | 3/1917 | Hornthal | 182/161 |
| 2,743,861 | A |   | 5/1956 | Mattis et al. |  |
| 6,182,926 | B1 | * | 2/2001 | Moore | 244/118.5 |
| 6,520,451 | B1 |   | 2/2003 | Moore |  |
| 7,083,145 | B2 | * | 8/2006 | Mills | 244/118.5 |
| 7,513,457 | B2 | * | 4/2009 | Schalla et al. | 244/118.5 |
| 2005/0178909 | A1 | * | 8/2005 | Mills | 244/118.6 |
| 2007/0125909 | A1 | * | 6/2007 | Seiersen et al. | 244/118.5 |
| 2008/0149765 | A1 | * | 6/2008 | Retz et al. | 244/118.6 |

FOREIGN PATENT DOCUMENTS

| EP | 1 010 617 A2 | 6/2000 |
| EP | 1 293 425 A2 | 3/2003 |

* cited by examiner

*Primary Examiner* — Timothy D Collins
*Assistant Examiner* — Brian M. O'Hara
(74) *Attorney, Agent, or Firm* — Oblon, Spivak, McClelland, Maier & Neustadt, L.L.P.

(57) ABSTRACT

A rest compartment configured for at least one aircraft pilot includes a berth arranged at least partially above an aisle separating two monuments. The first and second monuments are located behind a cockpit of an aircraft. One of the monuments comprises an access to the berth.

22 Claims, 3 Drawing Sheets

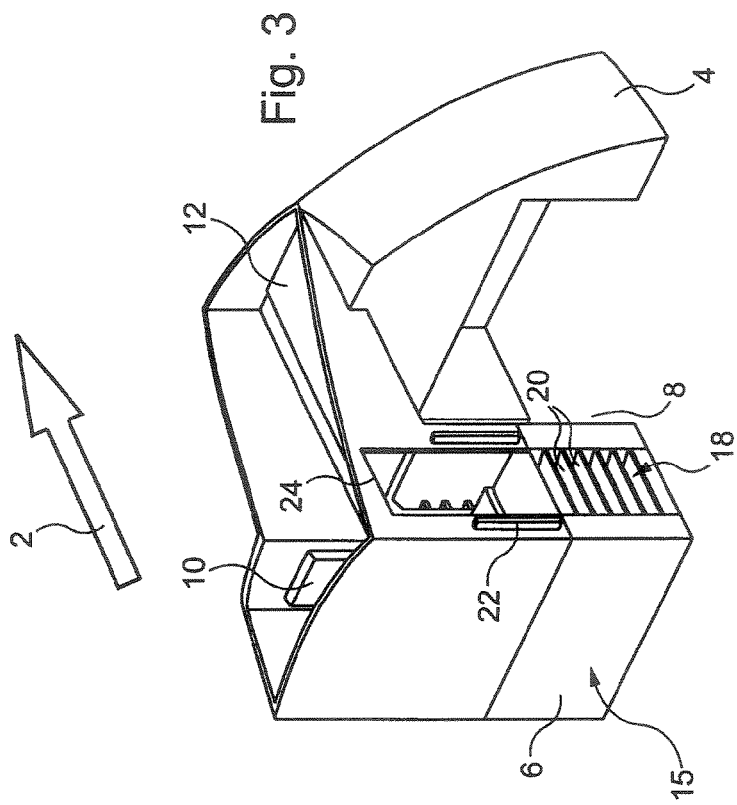
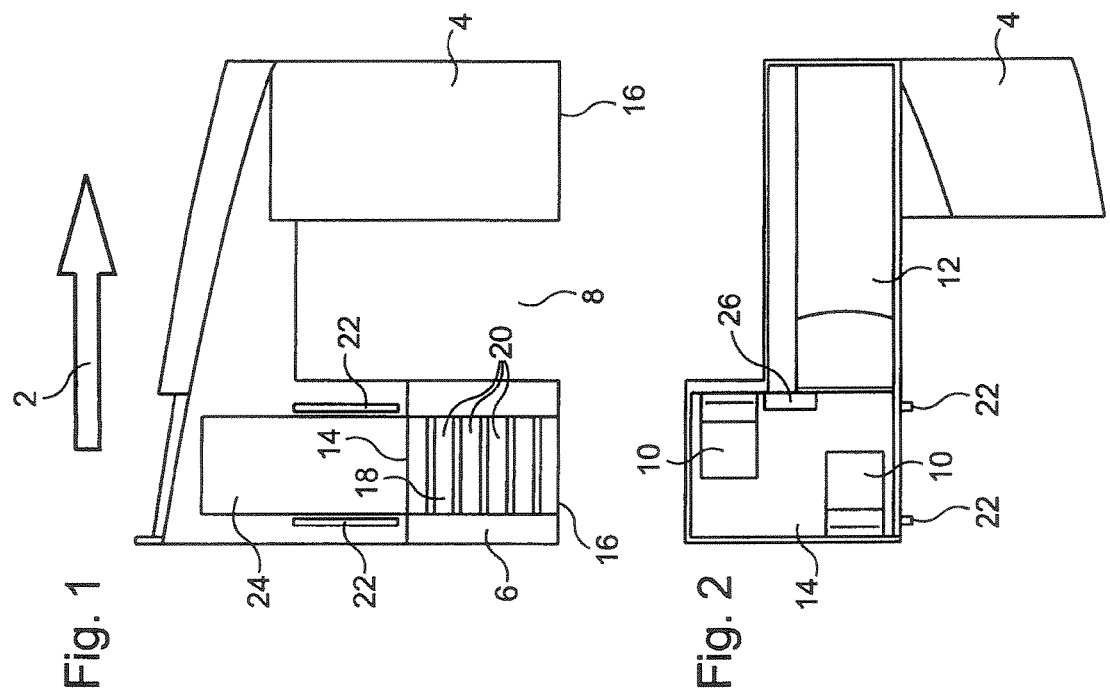

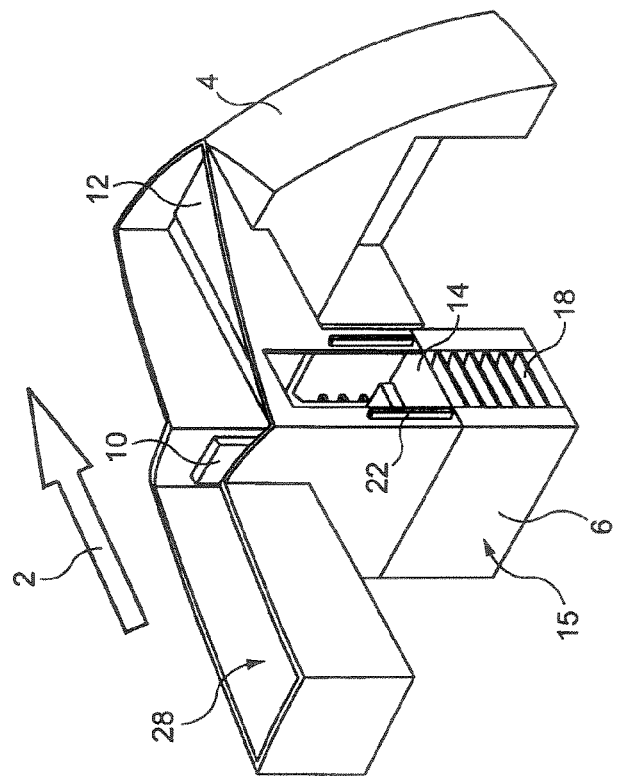
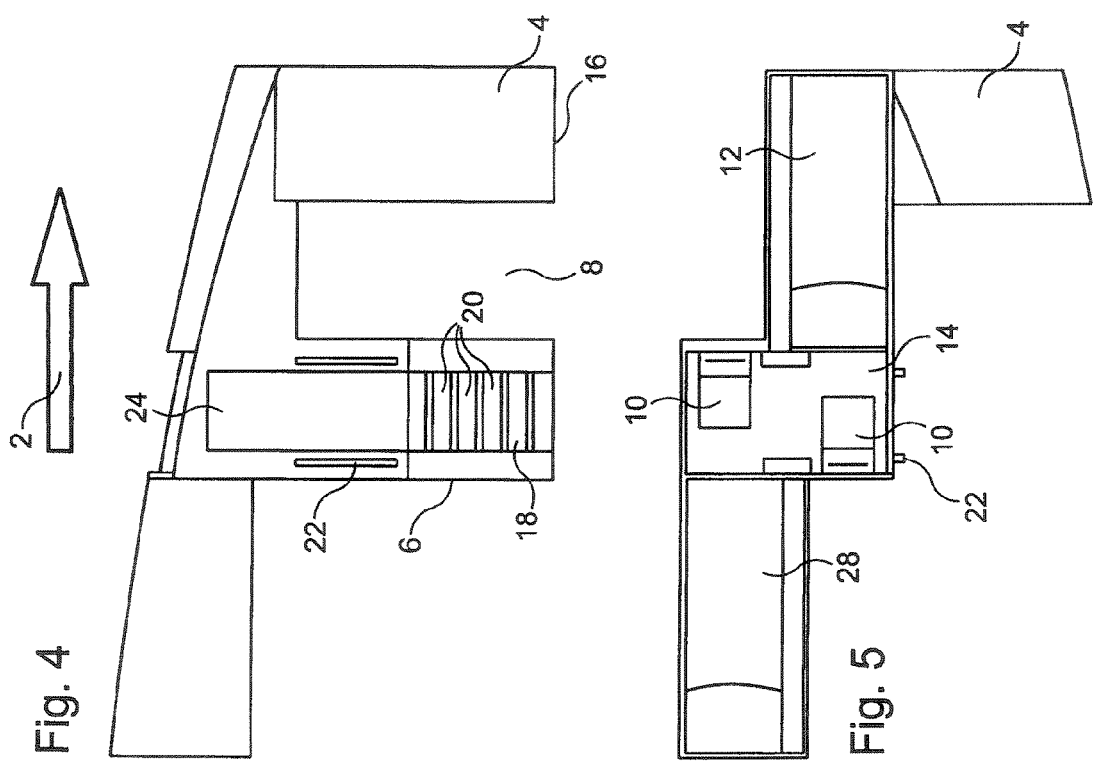

REST COMPARTMENT FOR AN AIRCRAFT PILOT

BACKGROUND OF THE INVENTION

I. Field of the Invention

This invention relates to a rest compartment for one or more aircraft pilots.

II. Description of Related Art

During long-distance flights, the pilots of an aircraft take turns at the controls. Thus, some pilots are resting while others are piloting the aircraft. For reasons of security, in particular following the terror attacks of Sep. 11, 2001, it is preferable that the compartment in which the pilots rest be located in immediate proximity to the cockpit of the aircraft. Changeovers of pilots at the controls of the aircraft preferably should take place without the passengers being able to be aware thereof.

In most of the known aircraft, the rest compartment for the pilots is located in the upper portion of the cabin intended for the transport of passengers. Thus for example, in document EP-1 010 617, a compartment with berths is provided in the upper portion of the aircraft above the area intended to accommodate passengers. Access to the rest compartment is accomplished from a space intended to accommodate carts (or trolleys). A staircase then is provided to allow access to the rest compartment. This solution has a dual disadvantage. First of all, it is disadvantageous in terms of storage, since two carts must be stored elsewhere in the cabin. Then, the rest compartments are arranged above the passengers and therefore are disadvantageous for the space available in the cabin of the aircraft.

BRIEF SUMMARY OF THE INVENTION

The purpose of this invention then is to provide a rest space for at least one pilot close to the cockpit and encroaching as little as possible on the passenger cabin.

To this end, this invention proposes a rest compartment intended for at least one pilot of an aircraft, the aircraft having a cockpit behind which there is located a first monument separated from a second monument by an aisle.

According to this invention, a berth is arranged at least partially above the aisle separating the two monuments, and one monument is laid out so that it comprises an access to the berth.

By monument there is understood here a structure fastened to the floor and in the field of aviation usually referred to by the English term "monument." It involves, for example, a storage module, a lavatory, a galley, a cloakroom, etc.

In this manner, a rest compartment is implemented by using a space until then unused in an aircraft. In addition, this rest compartment is close to the cockpit of the aircraft, which is favorable in terms of security.

In a preferred embodiment, the monument comprising the access to the berth has a storage space intended to accommodate carts and the access to the berth has a landing implemented above a storage space intended to accommodate carts. This landing (and the corresponding space) can serve in particular as space in which the pilot using the rest compartment can change clothes. For example, a cloakroom can be provided in this space if there is sufficient room. The said landing advantageously forms a level intermediate between the floor of the cockpit and the bedding surface of the berth. Means such as stairs or ladder rungs, for example, are provided on the one hand for going from the floor of the cockpit to the landing for access to the berth, and on the other hand from the landing to the berth. An advantageous original embodiment provides that the means designed for making it possible to go from the floor to the landing for access to the berth comprise steps, that each step is in the form of a plank assembled pivoting between a first position where it is in a more or less vertical plane and a second position in which it is in a more or less horizontal plane. Such a staircase has the advantage of occupying very little space in the adjacent aisle and makes it possible not to encroach on the interior of the corresponding monument. Retractable handrails can be combined with the steps of the staircase, these handrails being in extended position when the steps are in a more or less horizontal plane and in retracted position when the steps are in more or less vertical position. The movement of these handrails then is coordinated with the movement of the steps of the staircase and these handrails do not needlessly form protuberances in the area for access to the rest compartment that furthermore may be a passage area.

When the rest compartment comprises a landing, a seat, for example, is arranged on the landing.

In accordance with a first embodiment of a rest compartment according to the invention, the access to the berth is implemented in the second monument. It then can be provided that the berth extending above the aisle is supported on the first monument above which it extends toward the cockpit. When this rest compartment comprises a landing, a second berth accessible from the landing also can be provided. This second berth extends, for example, in an opposite direction in relation to the first berth starting from the access landing.

According to another embodiment of a rest compartment in accordance with the invention, access to the berth is accomplished in the first monument. A variation on this embodiment provides that the berth extending above the aisle is supported on the second monument above which it extends toward the passenger cabin. A second berth accessible from a landing and arranged next to the first berth can be contemplated, the landing being implemented above a storage space in the monument, intended to accommodate carts.

Finally, this invention also relates to an aircraft comprising:
a cockpit,
a first monument located behind the cockpit,
a second monument,
an aisle separating the first monument from the second monument,
a rest compartment intended for at least one pilot of the aircraft,
in which a berth is arranged at least partially above the aisle separating the two monuments, and
in which one monument is laid out so that it comprises an access to the berth.

In addition, this aircraft can comprise an access door intended for the boarding and disembarking of passengers. The aisle then preferably is located more or less in the axis of the said access door. In this type of aircraft, the first monument preferably is located at least partially in front of the said access door, and the second monument preferably is located at least partially behind the said access door.

In the aircraft according to the invention, it can be provided that access to the berth is implemented in the first monument, that a longitudinal aisle separates the first monument from a lavatory, that the aisle opens into the cockpit of the aircraft, that a door closes off the aisle, that access to the berth is situated on one side of the door forming the aisle, and that an access to the lavatory is located on the side opposite the access to the berth in relation to the door closing off the aisle.

Details and advantages of this invention will emerge more clearly from the description that follows, presented with reference to the attached schematic drawings on which:

BRIEF DESCRIPTION OF THE DRAWINGS

FIG. 1 is a side view in elevation of a rest compartment according to the invention, FIG. 2 shows the rest compartment of FIG. 1 in a view from above, while FIG. 3 shows the rest compartment of FIGS. 1 and 2 in perspective, FIG. 4 shows in elevation a variation on embodiment of a rest compartment according to the invention, FIG. 5 shows a view from above of the rest compartment of FIG. 4, FIG. 6 shows in perspective the rest compartment of FIGS. 4 and 5.

DETAILED DESCRIPTION OF THE INVENTION

Figure 7:
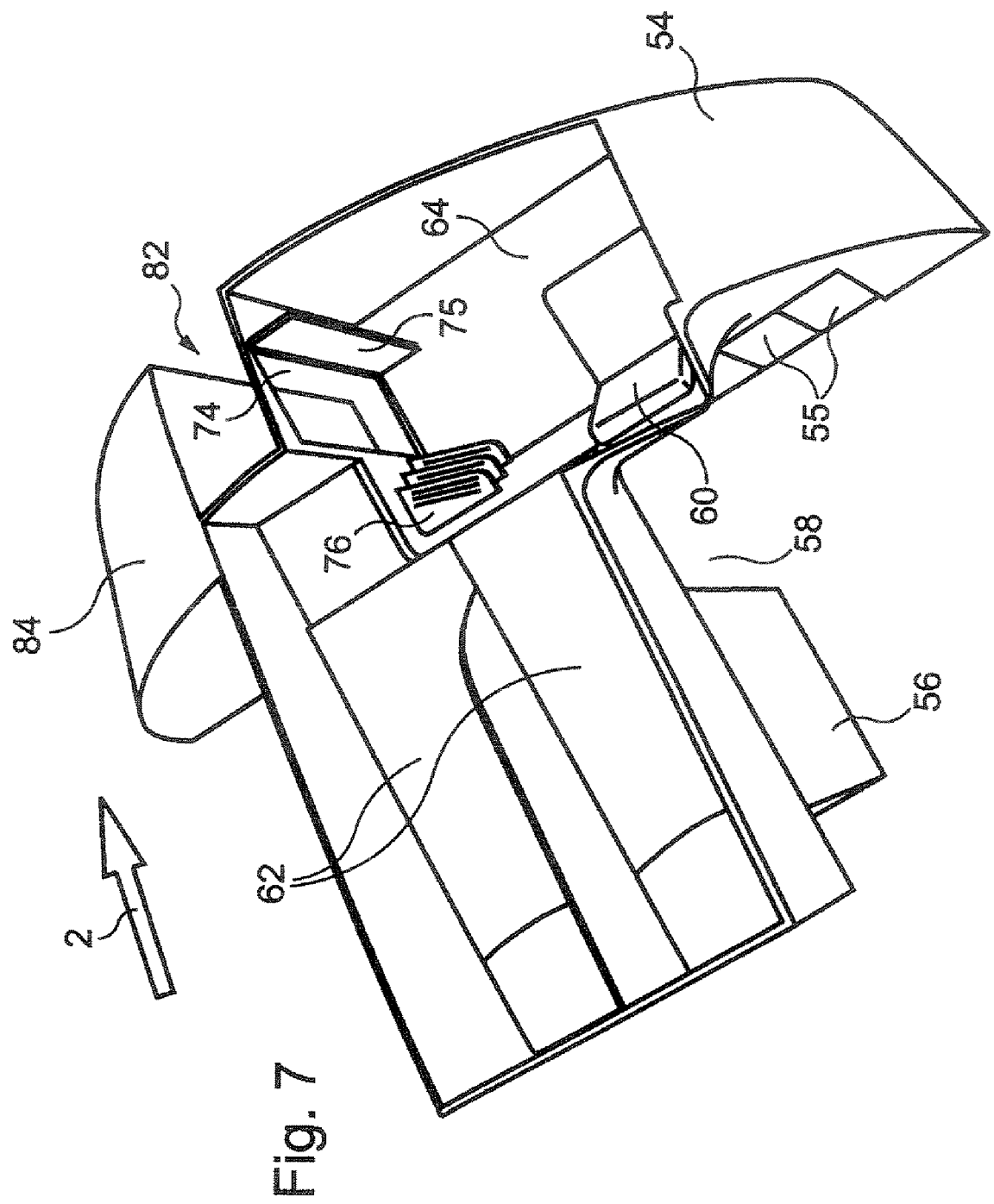
FIG. 7 shows in perspective another variation on embodiment of a rest compartment according to the invention.

As a preliminary observation, it is indicated that the arrows 2 depicted on the drawings correspond to the normal direction of movement of the aircraft under consideration.

In all the embodiments (FIGS. 1 to 7) the elements depicted are located just behind the cockpit (not depicted) of the aircraft under consideration. The elements depicted on the drawings therefore in each case are located at the front of the aircraft under consideration, at the level where the passengers usually enter the aircraft in order to access the passenger cabin (not depicted).

There is seen on FIG. 1 a first monument formed here in standard manner by a storage module 4 arranged just behind the cockpit of the aircraft. This first storage module 4 is located to the left of the passengers entering the aircraft through the left front door (the one usually used for boarding). This first storage module 4 usually accommodates the carts used for food and beverage service to the passengers, these carts usually being designated by the English term "trolley." The latter term will be used in the remainder of the description.

In standard manner for an aircraft, opposite this first storage module 4 positioned behind the cockpit there is located a second monument that here is also a storage module 6, arranged farther back in the aircraft and separated from the first storage module 4 by an aisle 8. When the passenger cabin that comprises seats for accommodating passengers has two aisles for access to these seats, the second storage module 6 is arranged in standard manner between the two aisles for access to the seats. Thus, the passengers boarding the aircraft enter the passenger cabin going past the second storage module 6 on their right or on their left, depending on the access aisle in which they are entering. Thus, some passengers boarding the aircraft pass through the aisle 8 to walk around the second module 6, while others go directly into an aisle for access to the seats.

As for this second storage module 6, it in turn also usually is used to accommodate trolleys.

As emerges from the foregoing, the aisle 8 is located more or less in the axis of the door allowing access to the cabin of the aircraft during a boarding or disembarking of passengers. Here the first door (not depicted) of the aircraft is involved. In relation to the direction of flight indicated on the drawings with the aid of the arrow 2, the first monument here comprising the storage module 4 is located at least partially in front of the first door. Likewise, the second monument, which here is the storage module 6, is located at least partially behind the first door. Preferably most of the first monument is located in front of the first door and most of the second monument is located behind this first door.

In the embodiment depicted in FIGS. 1 to 3, a rest compartment with two seats 10 and a berth 12 is implemented supported on the first storage module 4 and the second storage module 6 and straddling the aisle 8.

Access to this rest compartment is gained from the second storage module 6. In the embodiment depicted, a landing 14 is implemented above the storage space 15 of the second storage module 6 intended to accommodate trolleys. Considering the usual height of the trolleys used in aircraft, the landing 14 is situated at about 1.1 m from the floor 16 of the passenger cabin, which also is at the same level as the floor of the cockpit of the aircraft.

Access to the landing 14 is accomplished by a staircase 18. The latter preferably occupies a minimal space. It is advisable in particular to prevent the presence of this staircase from being disadvantageous to the storage space for the trolleys and its being necessary to reduce the number of trolleys that can be stored in this space.

It is proposed here that the staircase 18 be a collapsible staircase. Each step 20 of this staircase 18 is, for example, assembled pivoting between a first position where the step 20 is vertical and a second position where this step 20 is horizontal. The steps 20 are arranged one above the other. When they are all vertical, the steps 20 form a vertical wall and do not allow access to the landing 14. On the other hand, when all the steps 20 are horizontal, they allow access to the landing 14.

The term staircase was chosen here to designate the steps 20 as whole, because the latter have a considerable width and form a support surface for the foot of a user. Nonetheless, as the extended steps are one above the other, the term ladder also could be appropriate to designate the steps 20 as a whole.

The position of the staircase 18 and the size of the steps 20 are chosen so that, even when the staircase is in its extended position, the passage in front of the staircase 18 is sufficiently wide to meet aviation standards.

The staircase 18 is, as depicted on FIGS. 1 to 3, preferably arranged laterally in relation to the second storage module 6; that is, this staircase 18 is integrated into a vertical wall extending longitudinally in relation to the direction of movement of the aircraft. In addition, this access preferably is arranged on the side face of the second storage module 6 which is not visible from the door for boarding of passengers.

As can be seen on FIGS. 1 to 3, handrails 22 are arranged on both sides of the staircase 18, above the latter, to assist a user climbing or descending this staircase.

Above the staircase 18, there is located an opening 24 for access to the rest compartment. A door, not depicted, is provided for closing this opening. It involves, for example, a door having several panels folding back. One then has a door of the type used for closing off certain cupboards.

The handrails 22 mentioned above to assist in climbing or descending the staircase are, for example, arranged on both sides of the opening 24. An advantageous embodiment provides that these handrails 22 can be retracted inside the wall on which they are located. Thus, when they are retracted, needless protuberances in the area for access to the rest compartment are avoided. The movement of these handrails preferably is coordinated with that of the staircase 18. Thus, when the steps of the staircase 18 are extended, the handrails 22 emerge from their wall and when the staircase 18 goes into collapsed position, the handrails automatically retract into the corresponding wall.

As is seen more clearly on FIG. 2, the landing 14 accommodates two seats 10. It preferably involves seats that can be folded over. Thus, when the seats 10 are not being used, the landing 14 can serve as a passage for accessing in particular the berth 12. The berth 12 is implemented in an isolated space straddling the aisle 8 and supported on the first storage module 4 as well as the second storage module 6. Here the structure of these two modules can be used to hold the structure bearing the berth 12. It also is conceivable, however, to suspend this berth and its structure from the structure of the aircraft.

The berth 12 is arranged on the one hand to leave enough space for the pilot who is occupying this berth and on the other hand to leave a sufficient passage clearance, for example 1.9 m, at the level of the aisle 8 between the two storage modules. The diameter of the fuselage of the aircraft preferably is adapted to provide a sufficient space at the level of the berth 12.

Depending on the difference in height between the berth 12 and the landing 14, a ladder 26 can be provided to facilitate access to the berth 12.

FIGS. 4 to 6 show a variation on embodiment of the rest compartment of FIGS. 1 to 3. This variation takes up all the elements of the rest compartment of FIGS. 1 to 3. These elements then bear the same references on all these Figures.

As emerges from FIGS. 4 to 6, a second berth 28 is provided. This second berth 28 is arranged in an isolated compartment located in the upper portion of the cabin of the aircraft under consideration. This second berth 28 extends from the second storage module 6 toward the rear of the aircraft; that is, toward the passenger cabin. This second berth 28 then is arranged, for example, in a space usually used for the storage of passengers' baggage. Some baggage bins therefore must be removed in order to make it possible to arrange the second berth 28.

Considering the general shape of the front portion of the fuselage of an aircraft, the second berth 28 can be arranged higher than the first berth 12. For example, a ceiling height of 2.2 m under the second berth 28 in the passenger cabin can be provided. Such a height is not disadvantageous for the passengers and in no way hampers traffic in the passenger cabin. Here also, the diameter of the fuselage preferably is adapted so that the space at the level of the berth 28 is sufficient.

As can be seen on FIGS. 4 to 6, the two berths are positioned longitudinally in relation to the aircraft. However, they are offset in relation to one another. This allows, in particular, an easy access from the landing 14. As for the first berth 12, a ladder 30 also can be provided for accessing the second berth 28.

FIG. 7 shows a preferred embodiment of this invention. This embodiment proposes a rest compartment making it possible to accommodate two pilots, (practically) not encroaching on the space of the passenger cabin and accessible by the pilots exiting the cockpit without passing through the passenger cabin.

In this embodiment, there is a first storage module 54 serving in particular for the storage of trolleys 55. This first storage module 54 is arranged behind the cockpit (not depicted) of the aircraft. This first storage module 54 usually is positioned next to the cockpit. It may be provided, however, that a technical or similar compartment separates this storage module from the cockpit.

Opposite this first storage module 54, there is located, in standard manner, a second storage module 56. The latter also is intended in particular for the storage of trolleys (not visible on FIG. 7). An aisle 58 allows passage between the first storage module 54 and the second storage module 56. Here also, the aisle 58 is located at least partially at the level of the first door of the aircraft (that is, the first door for access to the interior of the aircraft from the cockpit). The first storage module 54 is entirely, or at the very least partially, in front of this first door, and the second storage module 56 is entirely, or at the very least partially, behind this first door.

In this embodiment, access to the rest compartment is accomplished from the first storage module 54. A landing 64 is provided above the storage space intended to accommodate trolleys 55. Access to this landing 64 is accomplished from an aisle 82 that leads to the cockpit of the aircraft. Such an aisle 82 ordinarily is found in an aircraft. It generally is implemented between the first storage module 54 and a lavatory 84. Access from the aisle 82 to the landing 64 is accomplished by a staircase (not visible on FIG. 7) that can be identical to the staircase 18 of the embodiments of FIGS. 1 to 6. At the top of the staircase, an opening 74 associated with a door 75 with two panels allows access to the landing 64. A seat 60 is located on this landing 64. Two berths 62 are accessible from the landing 64. These berths 62 extend longitudinally in relation to the aircraft and are arranged in part above the aisle 58, in part above the second storage module 56 and project slightly into the passenger cabin. The unit formed by the two berths 62 is more or less centered on the longitudinal axis of the aircraft. Thus, one berth 62 is located in the extension of the aisle 82 allowing access to the cockpit. To access these berths 62, a few steps 76 are provided. As the two berths 62 are located on the same side of the landing 64, the steps 76 are arranged so as to allow access to one and the other of the berths 62.

In order that access to the rest compartment depicted on FIG. 7 may be accomplished discreetly from the cockpit of the aircraft, without the passengers' being able to notice it, it suffices to provide a door closing off the aisle 82 for access to the cockpit on the side of the passenger cabin. When this door (not visible on FIG. 7 but located below the berth 62 situated in the extension of the aisle 82) is closed, the pilots can move freely between the cockpit and the rest space depicted on FIG. 7. Access to the lavatory 84 preferably will be accomplished on one side of the door closing off the aisle 82, and access to the rest compartment will be accomplished on the side opposite this door. The pilots thus have a direct access to the rest compartment without being seen from the cabin.

In these different embodiments depicted in the drawings and described above, the invention provides the pilots with a comfortable rest compartment close to the cockpit.

The proposed rest compartments make it possible to use the structure of the aircraft to create a rest space for the pilots. In addition, this rest space is arranged almost completely in a space that cannot be used for the passengers. The proposed solutions make it possible, for example, to store the same number of trolleys as in an airplane of the prior art. The proposed rest compartments meet aviation standards in terms of facilities and space provided. It is even possible to offer the pilots a comfort quite superior to that provided for by these standards.

This invention is not limited to the embodiments described above by way of non-limitative examples. It also relates to the variations on embodiment within the capacity of the individual skilled in the trade in the context of the claims below.

The invention claimed is:

1. A rest compartment for an aircraft with a cockpit and a passenger section including seats for passengers of the aircraft, said compartment being configured for at least one aircraft pilot, the rest compartment comprising:
   a first berth arranged at least partially above and across an aisle separating first and second monuments; and
   a second berth adjacent to the first berth, wherein
   the first and second monuments are located between the cockpit and the seats of the passenger section, the first monument being adjacent to and sharing a wall with the cockpit such that the aircraft pilot can access the berths from the cockpit without being seen by the passengers of the aircraft, the first monument is separated from the second monument by the aisle, and the first monument comprises an access to the first berth.

2. The rest compartment according to claim 1, wherein the first monument comprising the access to the first berth has a storage space configured to accommodate carts, and the access to the first berth includes a landing implemented above the storage space configured to accommodate carts.

3. The rest compartment according to claim 2, wherein the landing forms an intermediate level between a floor of the cockpit and a bedding surface of the first berth.

4. The rest compartment according to claim 3, further comprising a means for going from the floor of the cockpit to the landing for access to the first berth, and for going from the landing to the first berth.

5. The rest compartment according to claim 2, further comprising a seat arranged on the landing.

6. The rest compartment according to claim 2, wherein the second berth is accessible from the landing.

7. The rest compartment according to claim 6, wherein the second berth extends in an opposite direction in relation to the first berth with respect to the landing.

8. The rest compartment according to claim 1, wherein access to the first berth is implemented in the second monument.

9. The rest compartment according to claim 8, wherein the first berth is supported on the first monument above which the first berth extends toward the cockpit.

10. The rest compartment according to claim 1, wherein the first berth is supported on the second monument above which the first berth extends toward the passenger section.

11. The rest compartment according to claim 1, wherein the first monument comprising the access to the first berth includes a storage space configured to accommodate carts, the access to the first berth includes a landing.

12. The rest compartment according to claim 1, wherein the second berth is arranged at a higher level than the first berth.

13. An aircraft, comprising:
  a cockpit;
  a passenger cabin;
  a first monument being adjacent to and sharing a wall with the cockpit;
  a second monument;
  a first aisle separating the first monument from the second monument;
  a rest compartment configured for at least one pilot of the aircraft, including a berth arranged at least partially above the first aisle separating the first and second monuments, and in which the first monument is arranged to include an access to the berth; and
  an access door configured for the boarding and disembarking of passengers, the first aisle being located substantially in an axis of the access door,
  wherein the first and second monuments are located between the cockpit and seats of the passenger cabin.

14. The aircraft according to claim 13, wherein the first monument is located at least partially in front of the access door, and the second monument is located at least partially behind the access door with respect to a front of the aircraft.

15. The aircraft according to claim 13, wherein the access to the berth is implemented in the first monument, a second longitudinal aisle separates the first monument from a lavatory, the second aisle opens into the cockpit of the aircraft, a door closes off the second aisle, the access to the berth is located on one side of the door, and an access to the lavatory is located on a side opposite the access to the berth in relation to the door.

16. The aircraft according to claim 13, wherein the berth is not extended over any of the seats for the passengers.

17. The aircraft according to claim 13, wherein the rest compartment includes:
  a plurality of steps extending from a floor of the cockpit to a landing located above the floor and providing access to the berth, wherein
  each step is a plank pivotably assembled between a first position where the step is in a substantially vertical plane and a second position in which the step is in a substantially horizontal plane.

18. The aircraft according to claim 17, wherein retractable handrails are associated with the steps, the handrails being in an extended position when the steps are in the substantially horizontal plane, and in a retracted position when the steps are in the substantially vertical plane.

19. The aircraft according to claim 13, wherein an interior of the compartment is accessible from the cockpit without crossing the first aisle.

20. The rest compartment according to claim 13, further comprising an additional berth.

21. A rest compartment for an aircraft with a cockpit and a passenger section including seats for passengers of the aircraft, said compartment being configured for at least one aircraft pilot, the rest compartment comprising:
  a first berth arranged at least partially above and across an aisle separating first and second monuments, the first monument being closer to a front of the aircraft than the second monument, wherein
  the first and second monuments are located between the cockpit and the passenger section, the berth being in immediate proximity to the cockpit such that the aircraft pilot can access the berth from the cockpit without walking by any of the seats for the passengers of the aircraft,
  the first monument is separated from the second monument by the aisle,
  one of the monuments comprises an access to the first berth,
  the monument comprising the access to the first berth has a storage space configured to accommodate carts, and the access to the first berth includes a landing implemented above the storage space configured to accommodate carts,
  the landing forms an intermediate level between a floor of the cockpit and a bedding surface of the first berth,
  the rest compartment includes a means for going from the floor of the cockpit to the landing for access to the first berth, and for going from the landing to the first berth, and
  the means for going from the floor of the cockpit to the landing for access to the first berth comprise a plurality of steps, and each step is a plank pivotably assembled between a first position where the step is in a substantially vertical plane and a second position in which the step is in a substantially horizontal plane.

22. The rest compartment according to claim 21, wherein retractable handrails are associated with the steps of the means for going, the handrails being in an extended position when the steps are in the substantially horizontal plane, and in a retracted position when the steps are in the substantially vertical plane.

* * * * *